(12) United States Patent
Leinhos et al.

(10) Patent No.: US 6,404,795 B1
(45) Date of Patent: Jun. 11, 2002

(54) INTERNAL WAVELENGTH CALIBRATION FOR TUNABLE ARF-EXCIMER LASER USING ATOMIC CARBON AND MOLECULAR OXYGEN ABSORPTION LINES

(75) Inventors: Uwe Leinhos, Göttingen; Jürgen Kleinschmidt, Weissanfels; Wolfgang Zschocke; Uwe Stamm, both of Göttingen, all of (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/917,427

(22) Filed: Jul. 27, 2001

Related U.S. Application Data

(63) Continuation of application No. 09/167,657, filed on Oct. 5, 1998, now Pat. No. 6,269,110.

(51) Int. Cl.[7] .............................. H01S 3/13; H01S 3/22
(52) U.S. Cl. ...................... 372/57; 372/29.021; 372/55; 372/58; 372/59; 372/60
(58) Field of Search .............................. 372/57, 58, 59, 372/55, 60, 29.021, 32, 20; 250/374

(56) References Cited

U.S. PATENT DOCUMENTS

| | | | |
|---|---|---|---|
| 4,319,843 A | 3/1982 | Gornall | 356/346 |
| 4,823,354 A | 4/1989 | Znotins et al. | 372/57 |
| 4,905,243 A | 2/1990 | Lokai et al. | 372/32 |

(List continued on next page.)

OTHER PUBLICATIONS

Green, et al., "Galvanic Detection of Optical Absorptions in a Gas Discharge,", *Applied Physic Letters*, vol. 29., No. 11., Dec. 1, 1976.

Wakabayashi, et al., "Billion Level Durable ArF Excimer Laser with Highly Stable Ernergy," SPIE 24th *Annual International Symposium on Microlithography*, Santa Clara, Calif., May 14–19, 1999.

(List continued on next page.)

*Primary Examiner*—Paul Ip
*Assistant Examiner*—Armando Rodriguez
(74) *Attorney, Agent, or Firm*—Sierra Patent Group, Ltd.; Andrew V. Smith

(57) ABSTRACT

A laser is provided having a gain medium including a laser gas and a photoabsorbing species. The photoabsorbing species has at least one photoabsorption line within an output emission spectrum of the laser. When the laser is an ArF-excimer laser, the photoabsorbing species is preferably either atomic carbon or molecular oxygen, which are formed after carbon- or oxygen-containing molecules introduced into the gain medium with the laser gas interact within the gain medium. An absolute wavelength of a narrowed emission of the laser can be calibrated when a narrowed output emission of the laser is tuned through at least one photoabsorption line of the photo-absorbing species. Preferably, a processor communicates with a detector and a wavelength selection unit, as well as a power supply when output beam energy is held constant, to automatically perform the calibration. Also preferably, one of tetrafluorocarbon, trifluoromethane, difluoromethane, fluoromethane and methane molecules are selected as the carbon-containing molecules and/or one of carbon dioxide, carbon monoxide or oxygen are selected as the oxygen-containing molecules. When carbon is selected, a photoabsorption line of atomic carbon at 193.0905 nm is compared with the spectral position of the narrowed emission of the laser to determine the absolute wavelength. When oxygen is selected, a photoabsorption line of molecular oxygen at one or more of 193.114 nm, 193.292 nm or 193.493 nm is compared with the spectral position of the narrowed emission. The absolute wavelength is calibrated within an accuracy range of around ±0.1 pm.

25 Claims, 3 Drawing Sheets

U.S. PATENT DOCUMENTS

| | | | |
|---|---|---|---|
| 4,911,778 A | | 3/1990 | Barnoach .................... 156/466 |
| 4,914,662 A | | 4/1990 | Nakatani et al. .............. 372/32 |
| 5,142,543 A | * | 8/1992 | Wakabayashi et al. ........ 372/32 |
| 5,198,872 A | | 3/1993 | Wakabayashi et al. ...... 356/352 |
| 5,218,421 A | | 6/1993 | Wakabayashi et al. ...... 356/352 |
| 5,307,364 A | | 4/1994 | Turner |
| 5,404,366 A | | 4/1995 | Wakabayashi et al. ........ 372/29 |
| 5,450,207 A | | 9/1995 | Fomenkov .................. 356/416 |
| 5,450,436 A | * | 9/1995 | Mizoguchi et al. ........... 372/59 |
| 5,642,374 A | * | 6/1997 | Wakabayashi et al. ........ 372/57 |
| 5,764,678 A | | 6/1998 | Tada ........................... 372/57 |
| 5,771,094 A | | 6/1998 | Carter et al. ................ 356/326 |
| 5,978,391 A | | 11/1999 | Das et al. ..................... 372/20 |
| 5,978,394 A | | 11/1999 | Newman et al. .............. 372/32 |
| 5,982,800 A | | 11/1999 | Ishihara et al. |
| 6,014,398 A | | 1/2000 | Hofmann et al. ............. 372/60 |

OTHER PUBLICATIONS

Babin, et al., "Ultraviolet Optogalvanic Laser Spectroscopy of Iron for Reference Wavelengths," *Optics Letters*, vol. 12., No. 7., Jul. 1987.

Sandstrom, "Argon Fluoride Excimer Laser Source for Sub–0.25mm Optical Lithography," *Optical/Laser Microlithography IV*, vol. 1463., 1991.

* cited by examiner

INTERNAL WAVELENGTH CALIBRATION FOR TUNABLE ARF-EXCIMER LASER USING ATOMIC CARBON AND MOLECULAR OXYGEN ABSORPTION LINES

PRIORITY

This application is a 37 C.F.R. 1.53(b) continuation application which claims the benefit of priority to U.S. patent application Ser. No. 09/167,657, filed Oct. 5, 1998, now U.S. Pat. No. 6,269,110.

BACKGROUND OF THE INVENTION

1. Field of the Invention

The present invention relates to an internal absolute laser emission wavelength calibration method and apparatus, and particularly to a laser having a discharge chamber wherein a molecular species is introduced, e.g., carbon- or oxygen-containing molecules, which reacts to form photoabsorbing species, such as atomic carbon or molecular oxygen, having one or more photoabsorption lines within the output emission spectrum of the laser, e.g., an ArF-excimer laser emitting around 193 nm, for calibrating an absolute wavelength of the laser output emission.

2. Discussion of the Related Art

The formation of structures in the range of 100 nm by employing optical microlithography requires deep ultraviolet (DUV) light sources as exposure tools. Today, one of the most efficient light sources in this spectral range is the Argon Fluoride (ArF)-excimer laser emitting light around a wavelength of 193.3 nm and having a bandwidth (FWHM) of approximately 430 pm. KrF-excimer lasers emitting around 248 nm are also widely used. $F_2$-excimer lasers emitting around 157 nm are coming into use and are believed to become more widely used as the formation of smaller structures on silicon substrates is desired.

Resolvable structures are generally formable if their sizes are approximately on the order of the emission wavelength of the photolithographic radiation source being used, or larger. Special techniques have thus been developed to enable the formation of structures half the size of the source wavelength. A first technique uses refractive imaging optics to deliver the light from the excimer laser to the substrate for processing. In this technique, exposure of wafer substrates is carried out by using a complex system of lenses. This high resolution imaging process uses a drastically narrowed emission bandwidth for exposure to reduce dispersion effects otherwise associated with the refractive elements. Typical bandwidths (FWHM) used are less than 0.6 pm.

Additionally, the imaging optics used in this first technique are particularly selected for use with the output emission wavelengths of the radiation source. The optical system employs precise wavelength calibration having an accuracy within around ±0.1 pm together with an absolute wavelength stability within ±0.1 pm.

A second technique for reducing the resolvable size of structures formed on a silicon substrate employs reflective optical elements for the imaging process. This catadioptric technique has greater bandwidth flexibility, and typical bandwidths used are in the range of 25–50 pm.

To better enable precise wavelength selection for lithography, the emission wavelength of the exposure source, e.g., an excimer laser, is calibrated regularly. This calibration can be performed by tuning the narrowed excimer laser emission wavelength through a known absorption or inter-level transition line of, e.g., an atomic or molecular material filling a sealed module and having one or more resolvable absorption lines around the emission wavelength of the laser. An absorption or inter-level transition is detected, e.g., by a defined change in detected signal intensity through the material or an opto-galvanically modified potential difference between two points within the module. The laser is then tuned to a known absolute wavelength because the absolute wavelength of the absorption or inter-level transition line is known and any tuned offset of the laser output emission wavelength therefrom is substantially determinable.

Each of these techniques undesirably uses an additional sealed gas-filled module to perform absolute wavelength calibration. The additional module increases the size of a laser arrangement employing the calibration technique. Alignment of the module and supply and maintenance of the module and its peripheral monitoring equipment unsatisfactorily consume space, time and cost.

SUMMARY OF THE INVENTION

It is desired to have a method and apparatus for accurately and efficiently calibrating an absolute wavelength of an excimer laser. A laser system is thus provided comprising a discharge chamber filled with a gas mixture including a laser gas and trace amounts of a photoabsorbing species. The photoabsorbing species has at least one photoabsorption line within an output emission spectrum of the laser. The laser system further includes a wavelength selection unit and a detector. The output emission of the laser is narrowed and tuned within the broadband emission spectrum of the laser including the at least one photoabsorption line. An absolute wavelength of the narrowed emission can be calibrated when the narrowed emission is tuned through the photoabsorption line.

The photoabsorbing species is preferably either atomic carbon or molecular oxygen. The atomic carbon or molecular oxygen is preferably provided by first introducing trace amounts of carbon-containing molecules or oxygen-containing molecules, respectively, together in the discharge chamber with the laser gas. The carbon- or oxygen-containing molecules then react within the discharge chamber and atomic carbon or molecular oxygen are produced. A method of performing the calibration is provided along with means for performing the calibration steps.

Preferably, a processor communicates with the detector and the wavelength selection unit to automatically perform the calibration. Also preferably, one of tetrafluorocarbon, trifluoromethane, difluoromethane, fluoromethane, methane, hydrocarbon and partially fluoronated hydrocarbon, ethane and partially fluoronated ethane, and propane and partially fluoronated propane molecules are selected as the carbon-containing molecules or one of carbon dioxide, carbon monoxide or oxygen are selected to provide the oxygen within the discharge chamber. When carbon is selected, a photoabsorption line of atomic carbon at 193.0905 nm is compared with the spectral position of the narrowed emission of an ArF-excimer laser to determine its absolute wavelength. When oxygen is selected, at least one photoabsorption line of molecular oxygen (the main absorption lines are 193.114 nm, 193.292 nm and 193.493 nm) is compared with the spectral position of the narrowed emission to determine the absolute wavelength. The absolute wavelength of the ArF-excimer laser may be calibrated with an accuracy within around 0.1 pm, and may be generally calibrated within an accuracy of around ten percent of the narrowed bandwidth of the laser system being used.

DETAILED DESCRIPTION OF THE PREFERRED EMBODIMENT

Figure 1:
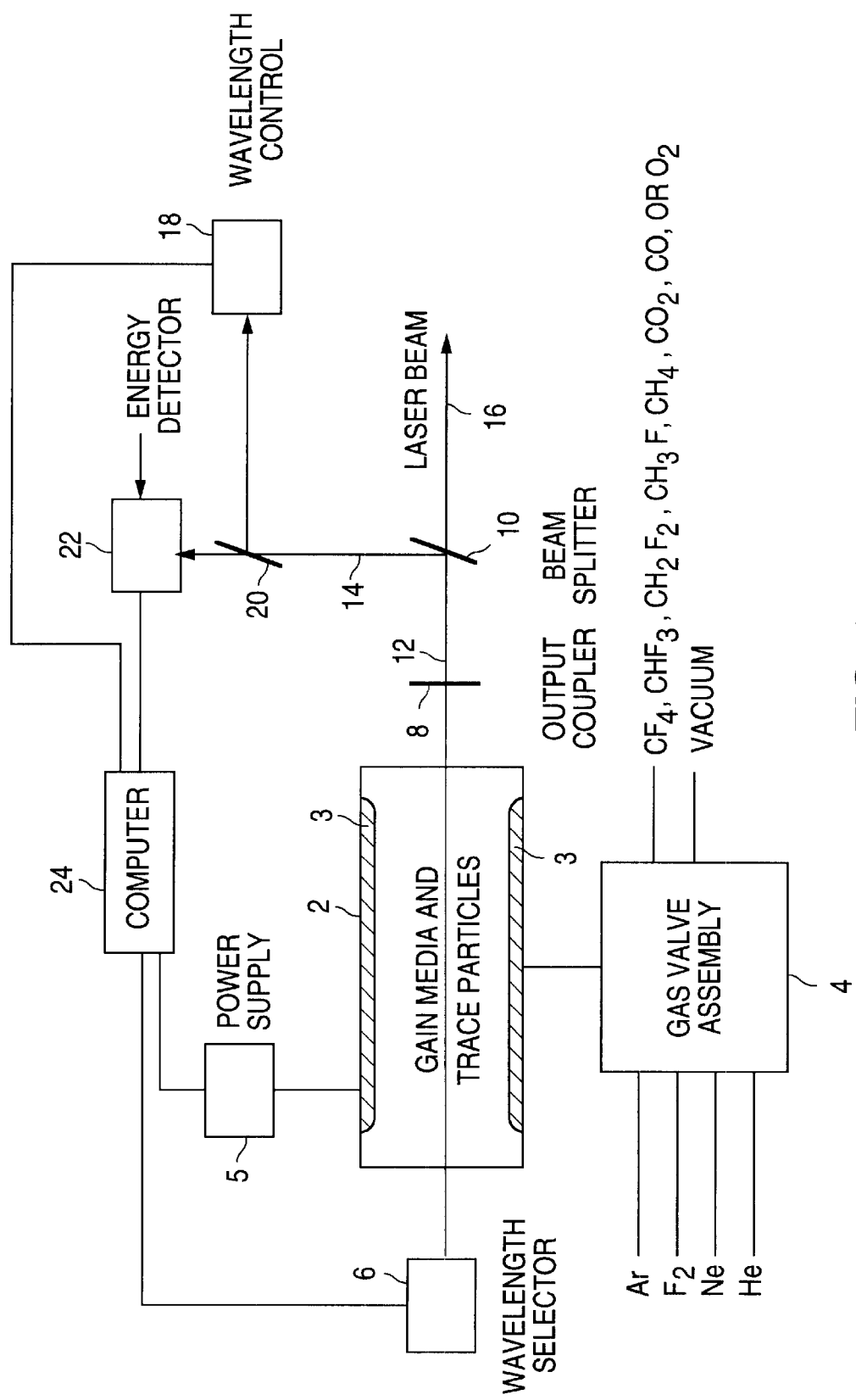
FIG. 1 schematically shows a laser system configured with absolute wavelength calibration capability in accord with the present invention.

Generally, the present invention provides a narrow band excimer laser including a discharge chamber including a photoabsorbing species having at least one photoabsorption line within an output emission spectrum of the laser. The photoabsorbing species is preferably either atomic carbon or molecular oxygen. In one aspect of the present invention, traces of carbon-containing molecules are introduced directly into the discharge chamber of an ArF-excimer laser and interact to form atomic carbon. In another aspect of the present invention, traces of oxygen-containing molecules are introduced into the discharge chamber and interact to form molecular oxygen. In this way, absolute wavelength calibration is possible using absorption lines of the photoabsorbing species, e.g., either the atomic carbon or the molecular oxygen. An accuracy of preferably around ±0.1 pm may be achieved via this technique for the ArF-excimer laser system.

The technique is also modifiable for use with other lasers such as, e.g., $F_2$-lasers and KrF-excimer lasers. Oxygen and carbon do not have absorption lines within the broadband output spectra of these lasers, however. Thus, the technique described here would be modified such that the photoabsorbing species used would have a photoabsorption line within the broadband emission spectrum of the laser for which wavelength calibration is sought.

Carbon atoms exhibit a strong photoabsorption line centered around 193.0905 nm due to an electronic transition from their ground state to an excited state. This photoabsorption line is advantageously within the broadband emission spectrum of the ArF-excimer laser.

Pure carbon (C) exists naturally in two solid forms, diamond and graphite. Stable synthetic structures known as "Fullerenes" have also been fabricated and studied. Each of these pure carbon solids, however, has extremely high melting and boiling points. It is thus somewhat difficult to affirmatively extract trace amounts of atomic carbon from these solid structures for introduction directly into the gain medium of an excimer laser.

Traces of Carbon exist, however, in various materials which comprise or are connected with an excimer laser discharge tube. According to R. Sandstrom, *Argon Fluoride Excimer Laser Source for Sub-0.25 Micron Optical Lithography*, SPIE vol. 1463, Optical/Laser Microlithography IV, pp. 610–616 (1991), carbon is a rather pervasive element, and can be introduced from many sources including hydrocarbon impurities in gas supplies, elastomer O-ring seals used in discharge chamber construction, electrode erosion, etc.

A recognized disadvantage of relying on atomic carbon contained or generated in a discharge tube of the laser is an uncertainty in the concentration of the carbon at any time. This is because the carbon concentration determines directly the magnitude of any measured photoabsorption therefrom. Moreover, calibration is performed after various nonstandardizable periods of laser operation, thus rendering any carbon concentration determination to be quite difficult. A more certain way to provide the gain media with atomic carbon is thus desired.

Another aspect of the present invention includes a direct introduction of traces of fluorocarbons, e.g., preferably tetrafluorocarbon ($CF_4$), into the laser discharge tube. One advantage of using tetrafluorocarbon is that it is gaseous at room temperature. Another advantage of selecting tetrafluorocarbon is that this compound is naturally formed during the discharge process of an excimer laser. Thus, the introduction of tetrafluorocarbon into the discharge chamber in accord with the present invention does not introduce a new species into the chamber.

Yet another advantage of the present invention uses the natural operating conditions of the excimer laser. The formation of excited state rare gas-halides such as ArF excimers is produced by transverse discharge pumping or electron beam pumping. Each of these pumping processes produces conditions wherein an average thermal energy of electrons in the discharge chamber is in the range from 3–4 eV. This energy and the concentration of high energy electrons is enough to break the chemical bonds of the tetrafluorocarbon compounds at a significant rate.

That is, $CF_4$-molecules, wherein a binding energy of a covalent C—F bond is around 485 kJ/mol, or about 5 eV, fragment upon electron bombardment according to the following equation:

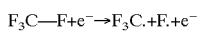

$$F_3C\text{—}F + e^- \rightarrow F_3C\cdot + F\cdot + e^-$$

Further iterations by subsequent electron-impact fragmentation produce short lived atomic carbon. This atomic carbon reacts quickly with available fluorine atoms of the laser gas mixture to again form fluorocarbons (such as $CF_4$). Sustainable concentrations of $CF_4$ in the laser gas mixture are around 200 ppb.

A preferred method for performing wavelength calibration of, e.g., an ArF-excimer laser is to tune a narrowed laser emission, using appropriate wavelength selection and tuning optics, close to or through the photoabsorption line of atomic carbon around 193.0905 nm. Performing a scan using the scanning range of 193.075 nm to 193.105, e.g., would enable a calibration determination of the output emission wavelength. During the calibration process, the laser is operated using a constant high voltage and the laser pulse energy E is detected with an energy detector as a function of the emission wavelength.

Around the wavelength of the carbon photoabsorption line at 193.0905 nm, intracavity losses increase and a decrease in pulse energy is detectable, assuming the discharge circuit voltage is held constant. The intensity minimum is approximately centered on the photoabsorption peak of atomic carbon known to be at 193.0905 nm, and thus when the laser output is tuned to that spectral position, the absolute. wavelength of the laser output emission beam is known precisely. The output beam may then be tuned to another desired emission wavelength λ by tuning the output beam away from the intensity minimum, corresponding to the peak in photoabsorption of the atomic carbon, by an amount equal to λ-193.0905 nm.

Alternatively, the laser can be run at a constant preset pulse energy. In this case, increasing intracavity losses around the carbon photoabsorption peak cause an increase in pumping energy determined by monitoring an increased discharge circuit high voltage input. By scanning the output beam through a spectral range as described above, the high voltage will reach a maximum value at the photoabsorption peak of atomic carbon around 193.0905 nm.

There are many further alternative methods of calibrating the wavelength of an output beam of, e.g., an ArF-excimer laser using the atomic carbon photoabsorption line enabled by the present invention. One is to determine a center of gravity wavelength $\lambda_{c.o.g.}$ from recorded spectra according to the following equation:

$$\lambda_{c.o.g.} = \Sigma(E_i \cdot \lambda_i)/\Sigma E_i;$$

wherein a scan is performed at constant input high voltage and the pulse energy of the output beam is monitored. Or, when a scan is performed at constant pulse energy and the input high voltage to the discharge circuit is monitored, the following equation may be used:

$$\lambda_{c.o.g.} = \Sigma(HV_i \cdot \lambda_i)/\Sigma HV_i$$

For baseline corrected, symmetric spectra, the center of gravity wavelength, $\lambda_{c.o.g.}$, corresponds to the wavelength which corresponds to maxima and/or minima in the spectra. This alternative center-of-gravity approach is advantageous when greater resolvability is desired such as in a case where the signal-to-noise ratio is low. Furthermore, maxima and/or minima in the spectra can be determined by calculating the wavelengths at which the first derivative $\delta E/\delta \lambda$ goes to zero.

FIG. 1 schematically shows a laser system configured with absolute wavelength calibration capability in accord with the present invention. The laser system includes a discharge chamber 2 filled with a gas mixture including a gain medium. The gain medium is excited by a high voltage applied across a pair of electrodes 3 by a power supply 5. The interior volume of the discharge chamber 2 is connected to a gas valve assembly 4. The gas valve assembly 4 is manipulated to control the gas mixture within the discharge chamber 2. As shown, preferably any of Ar, $F_2$, Ne, He, $CF_4$, $CHF_3$, $CH_2F_2$, $CH_3F$, $CH_4$, $CO_2$, CO, $O_2$ and vacuum may be allowed fluid access to the discharge chamber in controllable amounts and proportions, preferably using one or more regulators. Other gases such as hydrocarbon and partially fluorinated hydrocarbon molecules, ethane and partially fluorinated ethane molecules, and propane and partially fluorinated propane molecules may be included in this group.

Note that the valve assembly 4 of the arrangement of FIG. 1 is connected to gases including those that an ArF-excimer laser would contain in its mixture of laser active gases. Note also that some preferred organic and oxide molecular gases to be introduced into the gas mixture of the laser to provide atomic carbon or molecular oxygen within the gas mixture are shown, wherein each of the atomic carbon and the molecular oxygen has one or more photoabsorption lines around 193 nm, i.e., around the output emission wavelength of the ArF-excimer laser. One of ordinary skill in the laser art could use other gases not specifically shown to obtain atomic carbon or molecular oxygen within the scope of the present invention. One of ordinary skill could also have another laser active medium such as that for a $F_2$-, KrCl-, XeCl-, XeF- or KrF-excimer laser, e.g., wherein a different laser active gas mixture would be introduced and maintained, and wherein the same and/or different gaseous species would also be introduced which exhibit one or more photoabsorption lines around the emission wavelength of the excimer laser source.

A wavelength selector 6 is included in the arrangement of FIG. 1. Although not shown, the wavelength selector may include a prism and a highly reflective mirror, a grating and a prism, or a grating by itself, or another wavelength selection, narrowing and/or tuning means. The grating may function in a dual role including as a highly reflective surface of the resonator of the laser. The resonator is also shown to include an output coupler 8. The output coupler 8 reflects a portion of light incident upon it from the resonator and allows the remainder to continue outside the resonator. A first beam splitter 10 separates the output beam into a reflected portion 14 and a transmitted portion 16. The reflected portion 14 is monitored preferably in a feedback loop arrangement as shown in FIG. 1. The transmitted portion 16 propagates to a desired industrial use. Characteristics of the output beam 12 of the laser can be thus monitored on-line via monitoring the reflected portion 14 so that the transmitted portion 16 may be applied to industrial use while the monitoring process is performed.

A wavelength control mechanism 18 receives a reflection from a second beam splitter 20 and the remainder of the portion 14 reflected from the first beam splitter 10 is received by a detector 22. A processor 24 communicates with each of the wavelength selector 6, the detector 22, the wavelength control unit 18 and the power supply 5. The processor 24 receives wavelength dependent information about the output beam 16 from the energy detector 22, the wavelength selector 6 and the wavelength control unit 18. After the wavelength of the output beam 16 is scanned through a range of wavelengths including a photoabsorption line of, e.g., atomic carbon or molecular oxygen, the processor 24 stores the information and preferably generates a spectrum of output beam intensity versus wavelength, wherein the photoabsorption line appears at a known absolute wavelength. Using this information, the absolute wavelength of the output beam 16 of the laser is calibrated.

Figure 2:
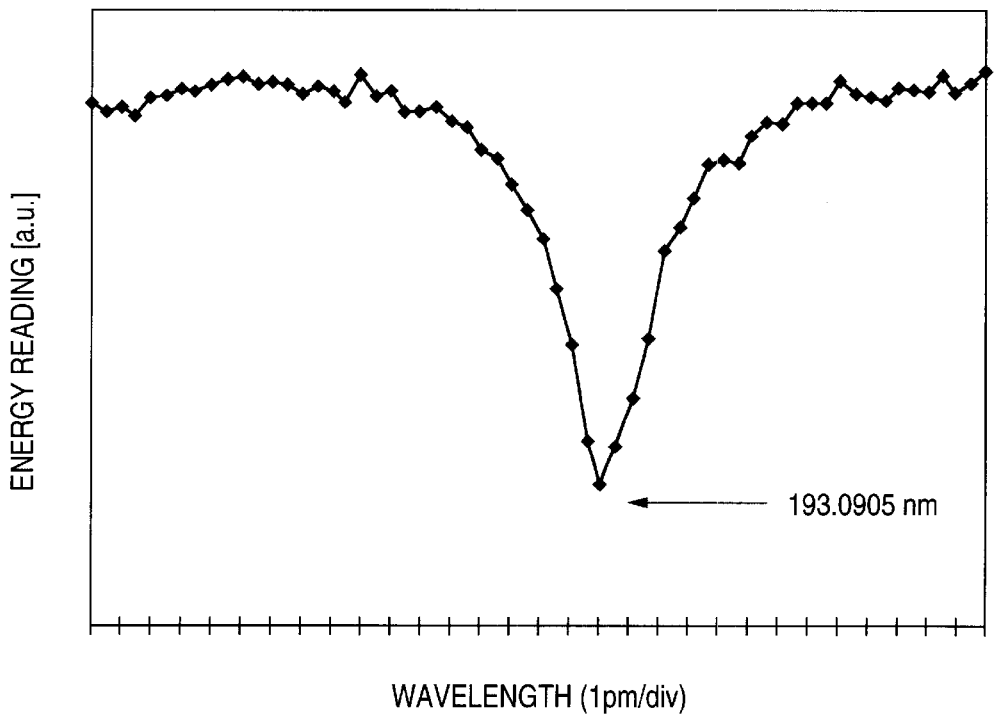
FIG. 2 is a graph showing an atomic absorption line of carbon at 193.0905 nm.

FIG. 2 is a graph showing the energy output measured at energy detector 22 and illustrating an atomic absorption line of carbon at 193.0905 nm. A constant high voltage was maintained across the electrodes of the discharge circuit during a wavelength scan to allow the effects of the intracavity losses due to photoabsorption by the carbon atoms in the gas mixture to be observed in the graph. The wavelength selector 6 of FIG. 1 was incremented in tuning steps of 0.5 pm. The sharp drop in pulse energy shown in the graph of FIG. 2 is due to carbon photoabsorption around 193.0905, and is set thereto using the center of gravity method described above. Traces of atomic carbon responsible for the photoabsorption observed in the graph of FIG. 2 were introduced into the gas mixture of an ArF-excimer laser via direct introduction of $CF_4$ and subsequent dissociation by electron bombardment in the discharge chamber 2. Alternatively, $CHF_3$, $CH_2F_2$, $CH_3F$, or $CH_4$ are introduced into the discharge chamber. Also alternatively, any organic species that will dissociate within the discharge chamber producing at least short-lived atomic carbon may be introduced in accord with the present invention.

Figure 3:
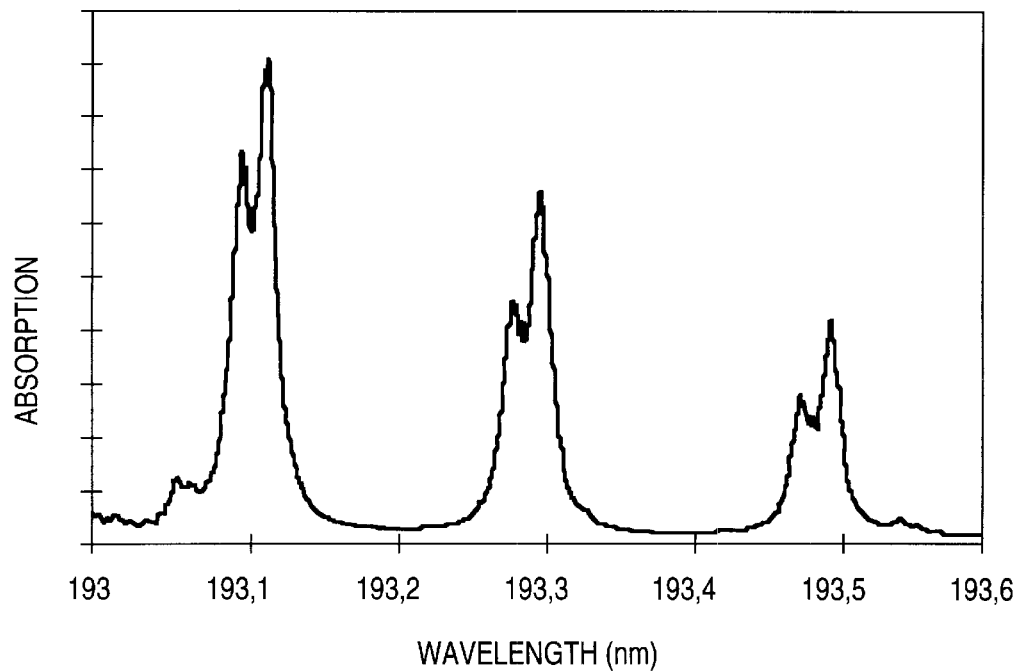
FIG. 3 is a graph showing molecular absorption lines of oxygen around 193 nm.

FIG. 3 is a graph showing molecular absorption lines of oxygen around 193 nm. The photoabsorption peaks shown in the graph of FIG. 3 are due to oxygen photoabsorption around 193.114 run, 193.292 nm and 193.493 nm. Traces of molecular oxygen responsible for the photoabsorption observed in the graph of FIG. 3 were introduced into the gas mixture of an ArF-excimer laser via direct introduction of $CO_2$ and subsequent dissociation by electron bombardment in the discharge chamber 2.

In contrast to atoms, electronic transitions in diatomic and polyatomic molecules include vibrational and rotational transitions. The absorption bands that are observed due to the transitions from the lowest vibrational state of the ground state of molecular oxygen ($O_2$) to vibrational bands of the first electronic excited state are the so-called "Schumann-Runge bands". The transition from the ground state to the fourth vibrational state of the first excited state, denoted as the 4-0 band, occurs upon irradiation of $O_2$ with light between 192.419 nm and 193.716 nm, as shown in FIG. 3. Within this spectral range, a series of rotational excitations occur. The most useful absorption lines of the 4-0 band for calibration purposes are those shown in FIG. 3, centered around 193.114 nm, 193.292 nm, and 193.493 nm.

Oxygen is introduced into the gain medium of a laser, e.g., an ArF-excimer laser, by adding trace amounts (e.g., hundreds of ppb) of preferably gaseous carbon dioxide ($CO_2$) to the gas mixture of the laser. Alternatively, CO or $O_2$ are added. Also alternatively, any molecular species which includes bound oxygen atoms, such as, e.g., oxide molecules, and is capable of dissociating within the discharge chamber of the laser to produce oxygen atoms which later combine to form $O_2$ molecules may be introduced in accord with the present invention. The carbon dioxide dissociates upon electron bombardment similar to mechanisms described above in the case of $CF_4$. As a result, molecular oxygen is formed or oxygen atoms are formed that recombine to form molecular oxygen $O_2$.

Figure 4:
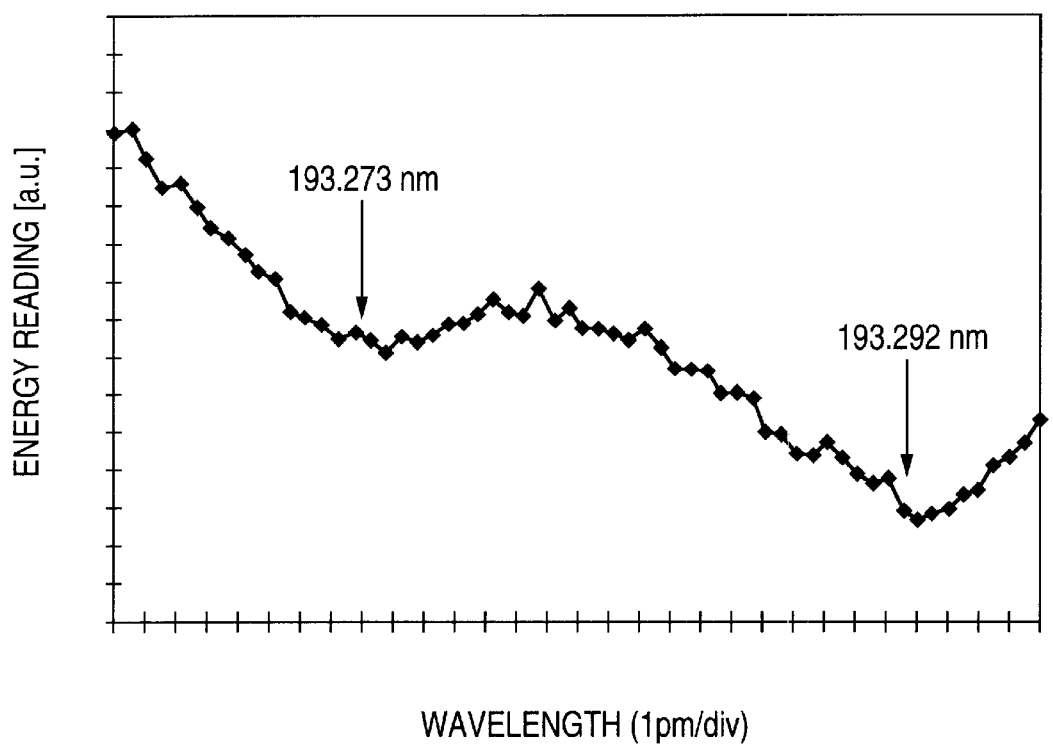
FIG. 4 is a graph showing the molecular absorption lines of oxygen at 193.273 nm and 193.292 nm.

FIG. 4 is a graph which shows the energy output measured at detector 22 and illustrates the molecular absorption lines of oxygen at 193.273 nm and 193.292 nm. The graph of FIG. 4 was generated by a similar method as that of FIG. 2. Data for generating the pulse energy versus wavelength spectrum was measured while a constant high voltage input across the electrodes of the discharge circuit of the discharge chamber was maintained while each data point was measured. The wavelength selector 6, described in FIG. 1, was tuned in steps of 0.5 pm. A clear drop in pulse energy can be observed due to the molecular oxygen absorption in two spectral locations. Two rotational transitions occur that are spectroscopically denoted as P(17) (193.292 nm) and R(19) (193.273 nm). Using this information, the absolute wavelength of the output beam 16 of the ArF-excimer laser is calibrated.

As with the calibration method used with the atomic carbon photoabsorption line, one method for performing absolute wavelength calibration using the molecular oxygen absorption lines includes the step of tuning the laser using wavelength selector 6 near one of the absorption lines of molecular oxygen, e.g., at 193.292 nm. Either the high voltage can be held constant and the output beam pulse energy measured versus wavelength or the laser pulse energy can be held constant while the high voltage of the discharge circuit is measured as a function of wavelength. At the photoabsorption wavelength, either a decrease in pulse energy or an increase in high voltage, respectively, is then observed. Thereafter, when the wavelength selector 6 determines that the output beam 16 of the laser is at a wavelength corresponding to the center of either the pulse energy valley or the high voltage peak, respectively, then the wavelength of the output beam 16 is reliably determined to be 193.292 nm. The output beam 16 may be tuned to another desired emission wavelength $\lambda$ by tuning the wavelength selector by an amount equal to ($\lambda$-193.292 nm).

In addition to absolute wavelength calibration the method of the present invention can be used to calibrate the dispersion or dispersivity, e.g., $\delta\lambda/\delta\alpha$ of a tuning element, wherein cc is the tuning angle of the tuning instrument, by using two or more absorption lines, e.g., those at 193.114 nm and 193.493 nm or one of the molecular oxygen absorption lines and the carbon line at 193.0905. An exemplary procedure for calibrating the dispersion is described below.

The laser is tuned to a first absorption line at a first known wavelength and a first tuning angle of a tuning element of the wavelength selection unit is noted. The laser is next tuned to a second absorption line at a second known wavelength and a second tuning angle is noted. In a linear approximation, the ratio of the difference between the wavelengths of the first and second lines and the difference between the corresponding tuning angles is taken to be the dispersion, $\delta\lambda/\delta\alpha$.

The laser may be tuned to further absorption lines at known wavelengths and the corresponding tuning angles noted. An approximation for $\delta\lambda/\delta\alpha$ of the tuning element can then be calculated based on the relationships between the spectral positions of the absorption lines and the associated tuning angles noted.

This technique for calibrating the dispersion is advantageous over conventional techniques. For example, one conventional technique uses properties of an optical component such as a monitor etalon. A laser beam passing through the etalon goes through successive maxima and minima. The free spectral range of the monitor etalon is a wavelength range between successive maxima or minima, and corresponds to a measurable range of tuning angles for calculating the dispersion. A problem is that monitor etalons with sufficiently precisely known free spectral ranges have free spectral ranges around, e.g., 5–10±0.05 pm. Thus, to calibrate the dispersion over a 100 pm range, e.g., one tunes through 10–20 free spectral ranges of the etalon and, as a result, the error grows to as much as ±1 pm, i.e., about one percent. Moreover, the achievable precision is also around one percent for monitor etalons having larger free spectral ranges rendering them also inadequate.

What is claimed is:

1. An excimer laser system, comprising:
   a discharge chamber filled with a gas mixture including a laser gas and traces of an additive gaseous species;
   a gas valve assembly coupled with the discharge chamber for controlling the gas mixture within the discharge chamber, the gas valve assembly being coupled with gas supply lines including a first line for flowing said additive gaseous species, a second line for flowing a buffer gas of said laser gas, a third line for flowing a halogen containing species of said laser gas, and a fourth line for flowing an active rare gas of said laser gas, said additive gaseous species comprising a molecular species different from each of said halogen-containing species, said buffer gas and said active rare gas of said laser gas;
   a resonator including a wavelength selection unit for providing a narrowed emission of said laser; and
   a wavelength control unit;
   an energy detector;
   a processor for communicating with said wavelength selection unit and said wavelength control unit in a feedback loop arrangement, and for communicating with said power supply and said energy detector in a feedback loop arrangement,
   wherein a wavelength of the narrowed emission of said laser is controlled by the processor based on wavelength information received from said wavelength control unit, and
   wherein an energy of the output laser beam is controlled by the processor based on energy information received from said energy detector.

2. The laser system of claim 1, further comprising a beam splitter for reflecting a first beam portion of said output laser beam for detection by at least one of said energy detector and said wavelength control unit, and for transmitting the substantial portion of the output laser beam to be applied to industrial use.

3. The laser system of claim 1, further comprising a beam splitter for reflecting a first beam portion of said output laser beam and for transmitting a second beam portion of said output laser beam, one of said first and second beam portions being detected by at least one of said energy detector and said wavelength control unit, and the other of said first and second beam portions being applied to industrial use.

4. The laser system of claim 1, wherein said gas supply lines further includes a fifth line for allowing a vacuum source fluid access to the discharge chamber.

5. The laser system of claim 1, wherein said active rare gas is krypton.

6. The laser system of claim 1, wherein said active rare gas is argon.

7. The laser system of claim 1, wherein said wavelength selection unit includes a prism and a highly reflective mirror.

8. The laser system of claim 1, wherein said wavelength selection unit includes a grating and a prism.

9. An excimer laser system, comprising:
a discharge chamber filled with a gas mixture including a laser gas and traces of an additive gaseous species;
a gas valve assembly coupled with the discharge chamber for controlling the gas mixture within the discharge chamber, the gas valve assembly being coupled with gas supply lines including a first line for flowing said additive gaseous species, a second line for flowing a buffer gas of said laser gas, a third line for flowing a halogen containing species of said laser gas, and a fourth line for flowing an active rare gas of said laser gas, said additive gaseous species comprising a molecular species different from each of said halogen-containing, species, said buffer gas and said active rare gas of said laser gas;
a power supply for delivering energy to the gas mixture for generating an output laser beam;
a resonator including a wavelength selection unit for providing a narrowed emission of said laser; and
a wavelength control unit;
an energy detector;
beam splitter for reflecting a first beam portion of said output laser beam and for transmitting a second beam portion of said output laser beam, one of said first and second beam portions being detected by at least one of said energy detector and said wavelength control unit, and the other of said first and second beam portions being applied to industrial use;
a processor for communicating with said wavelength selection unit and said wavelength control unit in a feedback loop arrangement, and for communicating with said power supply and said energy detector in a feedback loop arrangement,
wherein a wavelength of the narrowed emission of said laser is controlled by the processor based on wavelength information received from said wavelength control unit, and
wherein an energy of the output laser beam is controlled by the processor based on energy information received from said energy detector.

10. The laser system of claim 9, wherein said gas supply lines further includes a fifth line for allowing a vacuum source fluid access to the discharge chamber.

11. The laser-system of claim 9, wherein said active rare gas is krypton.

12. The laser system of claim 9, wherein said active rare gas is argon.

13. The laser system of claim 9, wherein said wavelength selection unit includes a prism and a highly reflective mirror.

14. The laser system of claim 9, wherein said wavelength selection unit includes a grating and a prism.

15. An argon fluoride excimer laser system, comprising:
a discharge chamber filled with a gas mixture including a laser gas and traces of an additive gaseous species;
a gas valve assembly coupled with the discharge chamber for controlling the gas mixture within the discharge chamber, the gas valve assembly being coupled with gas supply lines including a first line for flowing said additive gas species, a second line for flowing a buffer gas of said laser gas, a third line for flowing a fluorine containing species of said laser gas, and a fourth line for flowing argon gas of said laser gas, said additive gaseous species comprising a molecular species different from each of said fluorine containing species, said buffer gas and said argon gas of said laser gas;
a power supply for delivering energy to the gas mixture for generating an output laser beam;
a resonator including a wavelength selection unit including a grating for providing a narrowed emission of said laser; and
a wavelength control unit;
an energy detector;
a beam splitter for reflecting a first beam portion of said output laser beam and for transmitting a second beam portion of said output laser beam, one of said first and second beam portions being detected by at least one of said energy detector and said wavelength control unit and the other of said first and second beam portions being applied to industrial use;
a processor for communicating with said wavelength selection unit and said wavelength control unit in a feedback loop arrangement, and for communicating with said power supply and said energy detector in a feedback loop arrangement,
wherein a wavelength of the narrowed emission of said laser is controlled by the processor based on wavelength information received from said wavelength control unit, and
wherein an energy of the output laser beam is controlled by the processor based on energy information received from said energy detector.

16. The laser system of claim 15, wherein said gas supply lines further includes a fifth line for allowing a vacuum source fluid access to the discharge chamber.

17. The laser system of claim 15, wherein said wavelength selection unit further includes a highly reflective mirror.

18. A krypton fluoride excimer laser system, comprising:
a discharge chamber filled with a gas mixture including a laser gas and traces of an additive gaseous species;
a gas valve assembly coupled with the discharge chamber for controlling the gas mixture within the discharge chamber, the gas valve assembly being coupled with gas supply lines including a first line for flowing said additive gas species, a second line for flowing a buffer gas of said laser gas, a third line for flowing a florine containing species of said laser gas, and a fourth line for flowing krypton gas of said laser gas, said additive gaseous species comprising a molecular species different from each of said fluorine containing species, said buffer gas and said krypton gas of said laser gas;

a power supply for delivering energy to the gas mixture for generating an output laser beam;

a resonator including a wavelength selection unit including a grating for providing a narrowed emission of said laser; and a wavelength control unit;

an energy detector;

a beam splitter for reflecting a first beam portion of said output laser beam and for transmitting a second beam portion of said output laser beam, one of said first and second beam portions being detected by at least one of said energy detector and said wavelength control unit, and the other of said first and second beam portions being applied to industrial use;

a processor for communicating with said wavelength selection unit and said wavelength control unit in a feedback loop arrangement, and for communicating with said power supply and said energy detector in a feedback loop arrangement, wherein a wavelength of the narrowed emission of said laser is controlled by the processor based on wavelength information received from said wavelength control unit, and wherein an energy of the output laser beam is controlled by the processor based on energy information received from said energy detector.

19. The laser system of claim 18, wherein said gas supply lines further includes a fifth line for allowing a vacuum source fluid access to the discharge chamber.

20. The laser system of claim 18, wherein said wavelength selection unit further includes a highly reflective mirror.

21. A molecular fluorine laser system, comprising:

a discharge chamber filled with a gas mixture including molecular fluorine as a laser gas, a buffer gas, and traces of a additive gaseous species;

a gas valve assembly coupled with the discharge chamber for controlling the gas mixture within the discharge chamber, the gas valve assembly being coupled with gas supply lines including a first line for flowing a buffer gas of said laser gas and a second line for flowing molecular fluorine of said laser gas, the gas supply lines not including a line for flowing an active rare gas, said additive gaseous species comprising a molecular species different from each of said molecular fluorine and said buffer gas;

a power supply for delivering energy to the gas mixture for generating an output laser beam;

a resonator including a wavelength selection unit for providing a narrowed emission of said laser; and an energy detector;

a beam splitter for reflecting a first beam portion of said output laser beam and for transmitting a second beam portion of said output laser beam, one of said first and second beam portions being detected by said energy detector, and the other of said first and second beam portions being applied to industrial use;

a processor for communicating with said power supply and said energy detector in a feedback loop arrangement.

wherein an energy of the output laser beam is controlled by the processor based on energy information received from said energy detector.

22. The laser system of claim 21, further comprising a wavelength control unit, and the processor further for communicating with said wavelength selection unit and said wavelength control unit in a feedback loop arrangement, and wherein a wavelength of the narrowed emission of said laser is controlled by the processor based on wavelength information received from said wavelength control unit.

23. The laser system of claim 21, wherein said gas supply lines further includes a third line for allowing a vacuum source fluid access to the discharge chamber.

24. The laser system of claim 18, wherein said wavelength selection unit includes a prism.

25. The laser system of claim 24, wherein said wavelength selection unit further includes a highly reflective mirror.

* * * * *